United States Patent
Ogura et al.

(10) Patent No.: US 8,218,050 B2
(45) Date of Patent: Jul. 10, 2012

(54) SOLID-STATE IMAGING APPARATUS, METHOD OF DRIVING SOLID-STATE IMAGING APPARATUS, AND IMAGING SYSTEM

(75) Inventors: Masanori Ogura, Kawasaki (JP); Hiroki Hiyama, Zama (JP); Tatsuya Ryoki, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 560 days.

(21) Appl. No.: 12/367,758

(22) Filed: Feb. 9, 2009

(65) Prior Publication Data

US 2009/0219429 A1    Sep. 3, 2009

(30) Foreign Application Priority Data

Feb. 28, 2008    (JP) .................................. 2008-048453

(51) Int. Cl.
*H04N 5/335* (2006.01)
(52) U.S. Cl. ...................................................... 348/308
(58) Field of Classification Search .................. 348/308, 348/205, 308.205
See application file for complete search history.

(56) References Cited

U.S. PATENT DOCUMENTS

| | | | |
|---|---|---|---|
| 6,188,094 B1 | 2/2001 | Kochi et al. | 257/232 |
| 6,605,850 B1 | 8/2003 | Kochi et al. | 257/431 |
| 6,670,990 B1 | 12/2003 | Kochi et al. | 348/310 |
| 6,946,637 B2 | 9/2005 | Kochi et al. | 250/208.1 |
| 6,960,751 B2 | 11/2005 | Hiyama et al. | 250/208.1 |
| 7,110,030 B1 | 9/2006 | Kochi et al. | 348/308 |
| 7,187,052 B2 | 3/2007 | Okita et al. | 257/444 |
| 7,227,208 B2 | 6/2007 | Ogura et al. | 257/292 |
| 7,283,305 B2 | 10/2007 | Okita et al. | 359/619 |
| 7,321,110 B2 | 1/2008 | Okita et al. | 250/208.1 |
| 7,408,210 B2 | 8/2008 | Ogura et al. | 257/233 |
| 7,429,764 B2 | 9/2008 | Koizumi et al. | 257/292 |
| 7,456,880 B2 | 11/2008 | Okita et al. | 348/243 |
| 7,460,162 B2 | 12/2008 | Koizumi et al. | 348/294 |
| 7,514,732 B2 | 4/2009 | Okita et al. | 257/292 |
| 7,531,885 B2 | 5/2009 | Okita et al. | 257/444 |
| 7,538,804 B2 | 5/2009 | Okita et al. | 348/241 |

(Continued)

FOREIGN PATENT DOCUMENTS

JP    2001-045375 A    2/2001

*Primary Examiner* — Scott J Sugarman
*Assistant Examiner* — Vipin Patel
(74) *Attorney, Agent, or Firm* — Fitzpatrick, Cella, Harper & Scinto

(57) ABSTRACT

A solid-state imaging apparatus includes a plurality of pixels arranged in a matrix in one or more rows and one or more columns, wherein each pixel includes a photoelectric conversion element converting light into an electric charge and outputs a read out signal based on the converted electric charge, a plurality of capacitors arranged correspondingly to each of the columns to hold the signal output from the plurality of pixels, and a horizontal scanning circuit for sequentially reading out the signals held by the plurality of capacitors, by sequentially transferring data pulse in response to a clock pulse. The horizontal scanning circuit includes a mask signal input portion to which a mask signal is input. When the plurality of pixels output the signals to the plurality of capacitors during a horizontal scan time period in which the horizontal scanning circuit reads out the signal of one row of the pixels, and the read out signals change, the mask signal is input to the mask signal input portion, and a transfer of the data pulse is disabled irrespective of the input of the clock pulse.

9 Claims, 10 Drawing Sheets

U.S. PATENT DOCUMENTS

| | | | |
|---|---|---|---|
| 7,547,871 B2 | 6/2009 | Hiyama et al. | 250/208.1 |
| 7,550,793 B2 | 6/2009 | Itano et al. | 257/239 |
| 7,557,847 B2 | 7/2009 | Okita et al. | 348/308 |
| 7,598,992 B2 * | 10/2009 | Matsuda | 348/294 |
| 2005/0174552 A1 | 8/2005 | Takada et al. | 355/53 |
| 2005/0269604 A1 | 12/2005 | Koizumi et al. | 257/291 |
| 2006/0043440 A1 | 3/2006 | Hiyama et al. | 257/291 |
| 2006/0044439 A1 | 3/2006 | Hiyama et al. | 348/308 |
| 2007/0052831 A1 | 3/2007 | Ogura et al. | 348/308 |
| 2007/0126886 A1 | 6/2007 | Sakurai et al. | 348/222.1 |
| 2007/0165127 A1 * | 7/2007 | Minami | 348/308 |
| 2007/0205439 A1 | 9/2007 | Okita et al. | 257/228 |
| 2008/0024630 A1 | 1/2008 | Hiyama et al. | 348/241 |
| 2008/0055445 A1 | 3/2008 | Hatano et al. | 348/302 |
| 2008/0062295 A1 | 3/2008 | Fujimura et al. | 348/301 |
| 2008/0062296 A1 | 3/2008 | Ogura et al. | 348/308 |
| 2008/0068480 A1 | 3/2008 | Okita et al. | 348/294 |
| 2008/0112016 A1 * | 5/2008 | Kume | 358/408 |
| 2008/0174688 A1 | 7/2008 | Okita et al. | 348/340 |
| 2008/0273093 A1 | 11/2008 | Okita et al. | 348/220.1 |
| 2009/0073298 A1 | 3/2009 | Ogura et al. | 348/308 |
| 2009/0109314 A1 | 4/2009 | Koizumi et al. | 348/308 |
| 2009/0159783 A1 | 6/2009 | Koizumi et al. | 250/208.1 |
| 2009/0159945 A1 | 6/2009 | Okita et al. | 257/292 |
| 2009/0201406 A1 | 8/2009 | Okita et al. | 348/308 |
| 2009/0207293 A1 | 8/2009 | Ryoki et al. | 348/308 |

* cited by examiner

SOLID-STATE IMAGING APPARATUS, METHOD OF DRIVING SOLID-STATE IMAGING APPARATUS, AND IMAGING SYSTEM

BACKGROUND OF THE INVENTION

1. Field of the Invention

The present invention relates to a solid-state imaging apparatus for a digital camera, a method of driving the solid-state imaging apparatus, and an imaging system.

2. Description of the Related Art

According to Japanese Patent Application Laid-Open No. 2001-045375, when CMOS imaging devices are used, there is performed an operation (hereinafter referred to as a BLK operation") of reading a signal corresponding to one row of pixels and sending the signal to a reading-out capacitor acting as a temporary storage unit. The time required to read from the imaging devices is shortened by making the BLK operation period temporally overlap the horizontal scanning time period for outputting the signal from the reading-out capacitor to the outside of the imaging device.

According to Japanese Patent Application Laid-Open No. 2001-045375, however, since the BLK operation period and the horizontal scanning time period are temporally overlapped, the pixel signal transfer operation in the BLK operation period adds noise by the BLK operation to a signal obtained by scanning in the horizontal scanning time period.

The noise generation mechanism will be described. FIG. 13 illustrates consumption current fluctuation and power source voltage fluctuation when the operating method of Japanese Patent Application Laid-Open No. 2001-045375 is used. When horizontal scanning signal HSRC pulses of the horizontal scanning circuit and pixel signal reading out signal pulses are input to the solid-state imaging apparatus, current is consumed in the clock buffer for waveform shaping of horizontal scanning signal HSRC, the circuit driven by horizontal scanning signal HSRC, and other circuits. More specifically, the time of generation of consumption current approximately corresponds to rise and fall transition periods of horizontal scanning signal HSRC. Here, descriptions are given by taking as an example, the power source voltage; the impedance of paths for receiving ground potential and other voltages has a limited value, so multiplying the impedance by consumption current gives power source voltage drop in the impedance. Thus the power source voltage fluctuation illustrated in FIG. 13 occurs. When horizontal scanning signal HSRC pulses are periodically input, consumption current/ power source voltage fluctuation synchronized with the pulses occurs. Typically, as an index for the performance of suppressing effects of power source voltage fluctuation on the signal output, PSRR (Power Supply Rejection Ratio) is used. Power source voltage fluctuation itself does not directly appear as noise in the signal output. However, unless PSRR has an infinite value, power source voltage fluctuation cannot be perfectly removed. Further, PSRR cannot have an infinite value. However, when only horizontal scanning signal HSRC pulses are periodically input, while noise caused by power source voltage fluctuation is generated in signals by horizontal scanning, this noise is synchronized with horizontal scanning signal HSRC. Thus, uniform noise is generated in the signals, so the noise is hard to spot; but when drive signal φTX1 as illustrated in FIG. 13 is input, consumption current/ power source voltage fluctuation unrelated to the period of horizontal scanning signal HSRC occurs at time A and time B. Consequently, peculiar noise occurs in the signal output at time A and time B, thus causing image degradation.

According to Japanese Patent Application Laid-Open No. 2001-045375, in addition to the consumption current in the clock buffer for pixel signal transfer, the operation of transferring a signal to the holding capacitor causes a constant current load to charge or discharge the capacitor acting as a temporary storage unit. Accordingly, due to power source voltage fluctuation caused by the drive signal different from horizontal scanning signal HSRC, noise is added to an image signal obtained by horizontal scanning.

SUMMARY OF THE INVENTION

An object of the present invention is to provide a solid-state imaging apparatus, a method of driving the solid-state imaging apparatus, and an imaging system which can prevent noise from being mixed, while making the BLK operation period temporally overlap the horizontal scanning time period.

A solid-state imaging apparatus according to the present invention includes: a plurality of pixels arranged along one or more rows, wherein the pixel includes a photoelectric conversion element converting light into an electric charge, and outputs a read out signal based on the electric charge converted by the photoelectric conversion element; a plurality of capacitors arranged correspondingly to the columns of the plurality of pixels to hold the signal output from the plurality of pixels; and a horizontal scanning circuit for sequentially reading out the signals held by the plurality of capacitors, by sequentially transferring data pulse in response to a clock pulse, wherein the horizontal scanning circuit comprises a mask signal input portion to which a mask signal is input, and when the plurality of pixels output the signals to the plurality of capacitors during a horizontal scan time period in which the horizontal scanning circuit reads out the signal of one row of the pixels, and the readout signals change, the mask signal is input to the mask signal input portion, and a transfer of the data pulse is disabled irrespective of the input of the clock pulse.

According to the present invention, there is provided a method of driving a solid-state imaging apparatus comprising: a plurality of pixels arranged along one or more rows, wherein the pixel includes a photoelectric conversion element converting light into an electric charge, and outputs a read out signal based on the electric charge converted by the photoelectric conversion element; a plurality of capacitors arranged correspondingly to the columns of the plurality of pixels to hold the signal outputted from the plurality of pixels; and a horizontal scanning circuit for sequentially reading out the signals held by the plurality of capacitors, by sequentially transferring data pulse in response to a clock pulse, wherein the horizontal scanning circuit comprises a mask signal input potion to which a mask signal is input, wherein the method comprising a step of: inputting the mask signal to the mask signal input portion and disabling the horizontal scanning circuit from transferring the data pulse irrespective of the input of the clock pulse, when outputting the signals from the plurality of pixels to the plurality of capacitors during a horizontal scan time period in which the horizontal scanning circuit reads out the signal of one row of the pixels, and the read out signals change.

Even when power source voltage fluctuation occurs due to the reading out signal unrelated to the period of the clock pulse, it is possible to prevent noise from being added to a pixel signal, so that high-quality image is provided.

Further features of the present invention will become apparent from the following description of exemplary embodiments with reference to the attached drawings.

DESCRIPTION OF THE EMBODIMENTS

First Embodiment

As a method of addressing the problem, there can be used a technique which holds horizontal scanning signal HSRC at a high level or a low level around a time when consumption current/power source voltage fluctuation not synchronized with the periodicity of horizontal scanning signal HSRC occurs, so that the horizontal scanning signal HSRC pulse is stopped. With this technique, it is possible to avoid peculiar consumption current/power source voltage fluctuation caused by a drive signal other than horizontal scanning signal HSRC. In this case, however, it was further found that the periodicity of consumption current/power source voltage fluctuation caused by the horizontal scanning signal HSRC pulse is not kept, thus causing noise.

Figure 1:
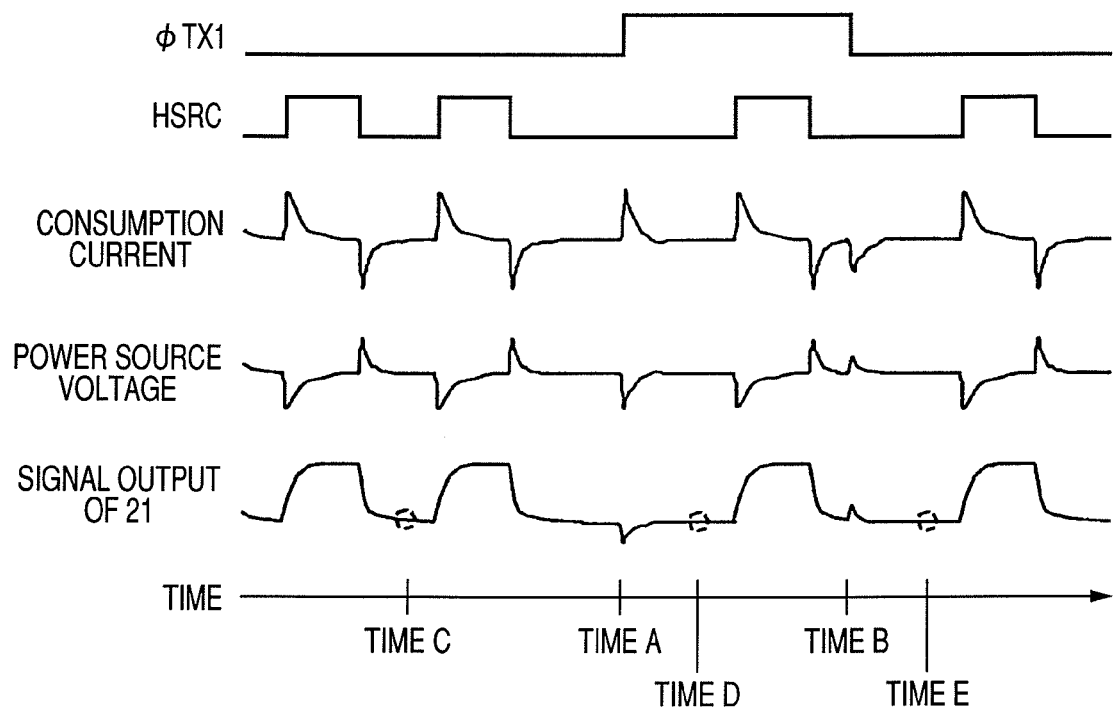
FIG. 1 is a schematic view illustrating a problem associated with the related art.

The method of driving a solid-state imaging apparatus will be described with reference to FIG. 1. Referring to FIG. 1, when the horizontal scanning signal HSRC pulse being the clock pulse is stopped, the noise dependent on peculiar consumption current/power source voltage fluctuation is prevented from being added to the signal output at time A and time B. However, since the horizontal scanning signal HSRC pulse is stopped, the periodicity of current consumed by the clock buffer and its related circuits is disturbed, so a potential difference occurs at time C, time D and time E before outputting of the signal, and thus noise is added to the signal output. Typically, the output signal is an output from an amplifier which uses the same power source as the horizontal scanning circuit for horizontal scanning signal HSRC, so the power source voltage of the amplifier fluctuates depending on increasing and decreasing of consumption power of the horizontal scanning circuit for horizontal scanning signal HSRC. This power source voltage fluctuation causes not a small output signal fluctuation. Further, even when the power source of the amplifier is different from that of the horizontal scanning circuit for horizontal scanning signal HSRC, the semiconductor area in which the horizontal scanning circuit for supplying horizontal scanning signal HSRC is formed is usually capacitance-coupled via a semiconductor substrate to the semiconductor area in which the amplifier is formed. When the increasing and decreasing of consumption power causes voltage fluctuation in the semiconductor area, voltage fluctuation occurs in the semiconductor area of the amplifier due to capacitance-coupling, so that the output signal fluctuates.

Figure 2:
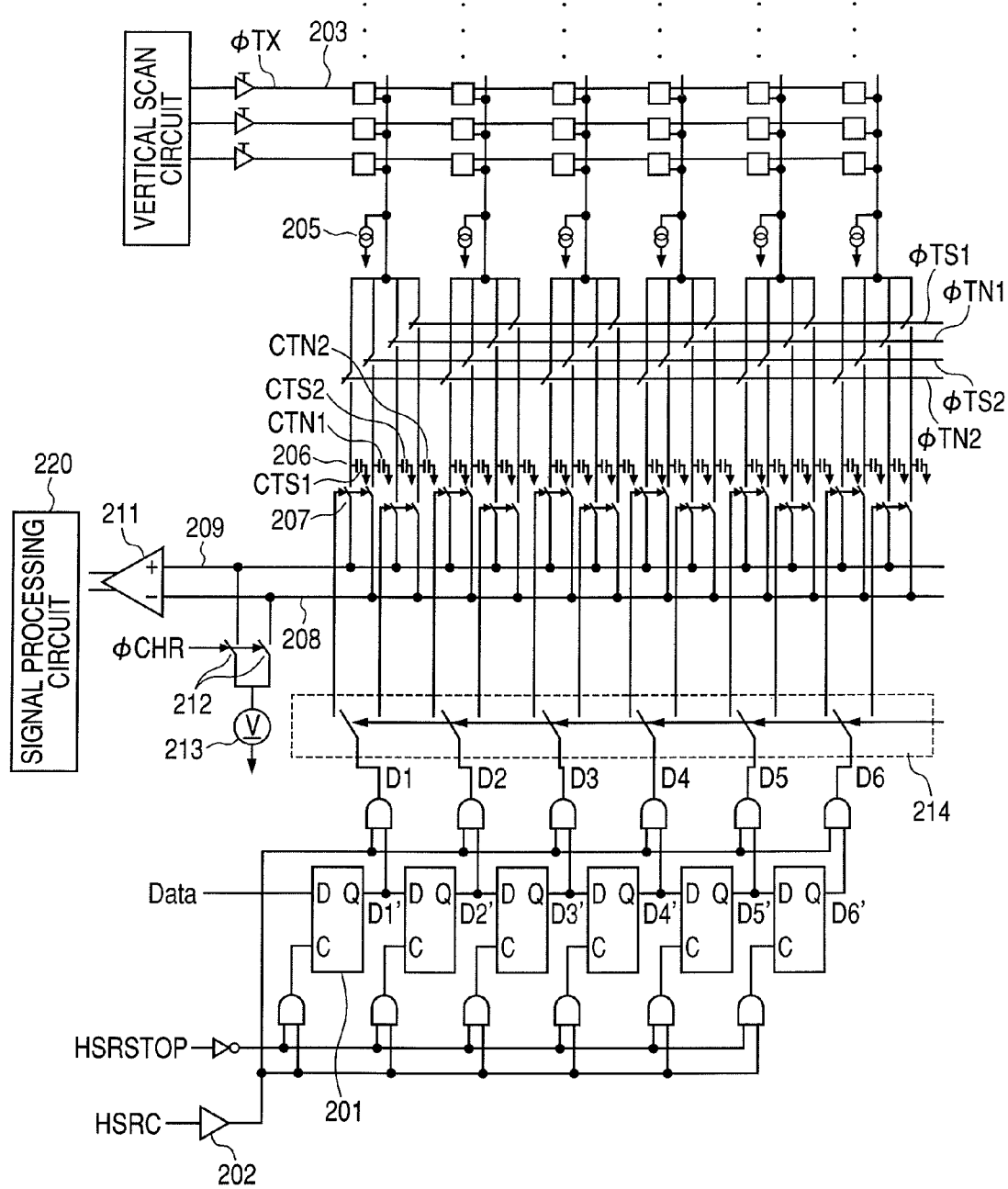
FIG. 2 is an equivalent circuit diagram for describing an embodiment of the present invention.

Thus, in the solid-state imaging apparatus according to a first embodiment of the present invention, while the periodicity of consumption current/power source voltage fluctuation in the operations related to horizontal scanning signal HSRC is kept, peculiar consumption current/power source voltage fluctuation and noise are avoided at time A and time B. A peculiar configuration is illustrated in FIG. 2.

The solid-state imaging apparatus according to the present embodiment will be described with reference to FIG. 2. An imaging system includes a solid-state imaging apparatus and signal processing circuit 220. Referring to FIG. 2, parts other than the signal processing circuit 220 constitute the solid-state imaging apparatus. First, the solid-state imaging apparatus will be described. A flip-flop 201 constitutes the horizontal scanning circuit. The horizontal scanning circuit further includes a clock buffer 202, terminal HSRSTOP being a mask signal input portion, and AND gate. The clock buffer 202 performs waveform shaping of horizontal scanning signal HSRC. Reference numeral 203 denotes a pixel; 205 a constant current load; 206 a capacitor which temporarily saves a pixel signal; 207 a switch used to connect the capacitor 206 to horizontal common lines 208 and 209 to read out a signal. An amplifier 211 is a differential processing circuit, and outputs a differential signal between a signal output to the horizontal common line 208 and a signal output to the horizontal common line 209. Reference numeral 212 denotes a switch used to reset the horizontal common lines 208 and 209 to a power source voltage 213; 213 denotes a power source voltage for resetting the horizontal common lines 208 and 209; 214 denotes a circuit which selects either of a pair of capacitors CTS1 and CTN1 and a pair of capacitors CTS2 and CTN2, the selected one being read out to the horizontal common lines 208 and 209. The method of reading a signal from the pixel 203 into the capacitor 206 will be described.

Figure 3:
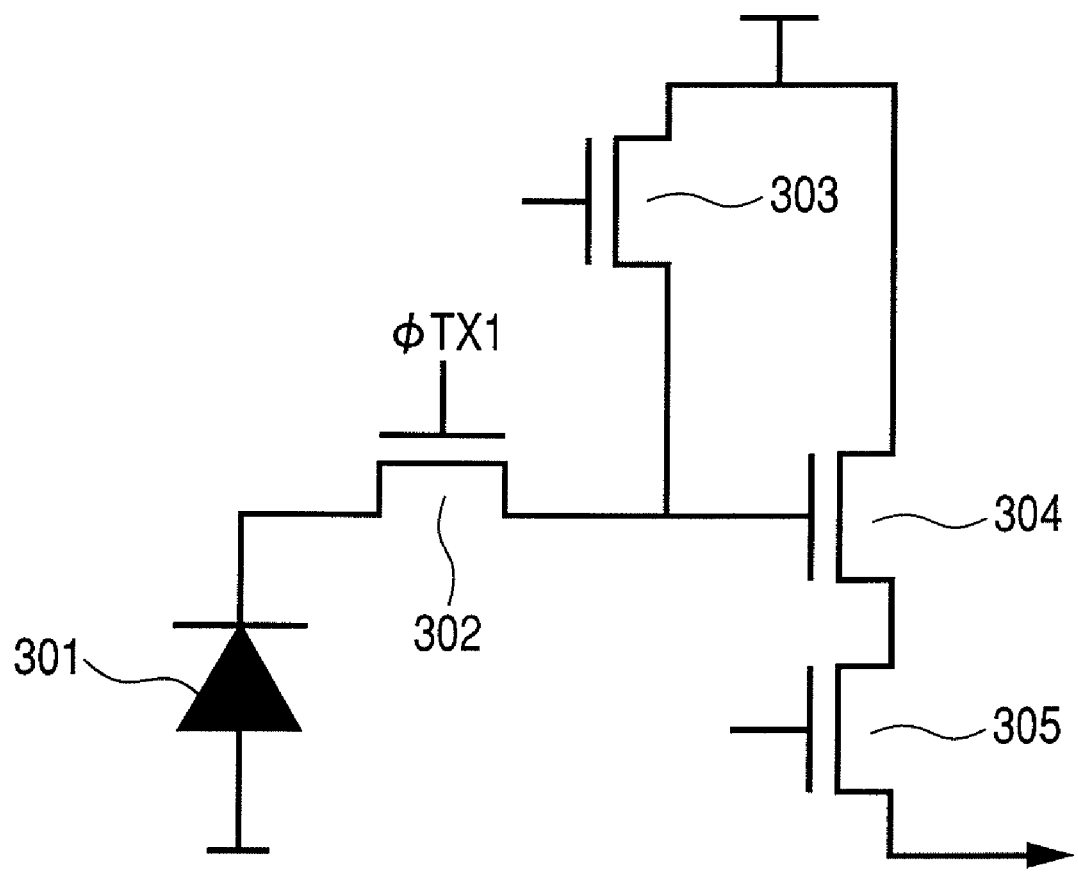
FIG. 3 is an equivalent circuit diagram for describing the embodiment of the present invention.

FIG. 3 illustrates an equivalent circuit diagram of the pixel 203. Reference numeral 301 denotes a photoelectric conversion element (photodiode) that produces electric charge by photoelectric conversion; 302 denotes a MOS field-effect transistor for reading the electric charge of the photoelectric conversion element 301; 303 denotes a MOS field-effect transistor for resetting the photoelectric conversion element 301; 304 denotes an in-pixel amplifier that amplifies the signal electric charge of the photoelectric conversion element 301; 305 denotes a row selection switch that selects one row of two-dimensionally arrayed pixels; φTX1 a drive signal for reading the electric charge from the photoelectric conversion element 301 of the pixel.

The vertical scanning circuit selects pixels of the Nth-row from the two-dimensionally arrayed pixels 203. More specifically, first, when the MOS transistor 305 is turned on to select pixels of the Nth-row. Subsequently, with the pixels selected, the MOS transistor 303 is turned on to reset the gate of the MOS transistor 304. The source voltage of the MOS transistor 304 has a value dependent on the gate voltage thereof; thus, when the signal φTN1 switch is turned on and the signal φTS1, φTN2 and φTS2 switches are turned off, a noise signal (reset level) after resetting is held by the capacitor CTN1. Subsequently, the MOS transistor 302 is turned on by the signal φTX1 to transfer the electric charge produced by the photoelectric conversion element 301 to the gate of the MOS transistor 304. As a result, the gate voltage of the MOS transistor 304 varies according to the transferred electric charge, so the source voltage of the MOS transistor 304 also varies. When the signal φTS1 switch is turned on and the signal φTN1, φTS2 and φTN2 switches are turned off, the pixel signal is held by the capacitor CTS1.

Subsequently, the vertical scanning circuit selects pixels of the N+1th row from among the two-dimensionally arrayed pixels 203. More specifically, first, when the MOS transistor 305 is turned on to select N+1th-row pixels. Subsequently, with the pixels selected, the MOS transistor 303 is turned on to reset the gate of the MOS transistor 304. The source voltage of the MOS transistor 304 has a value dependent on the gate voltage thereof; thus, when the signal φTN2 switch is turned on and the signal φTS2, φTN1 and φTS1 switches are turned off, a noise signal (reset level) after resetting is held by the capacitor CTN2. Subsequently, the MOS transistor 302 is turned on by the signal φTX2 to transfer the electric charge produced by the photoelectric conversion element 301 to the gate of the MOS transistor 304. As a result, the gate voltage of the MOS transistor 304 varies according to the transferred electric charge, so the source voltage of the MOS transistor 304 also varies. When the signal φTS2 switch is turned on and the signal φTN2, φTS1 and φTN1 switches are turned off, the pixel signal is held by the capacitor CTS2. Here, the operation of outputting the respective signals held by CTS1 and CTN1 to the horizontal common lines 208 and 209 and the operation of CTS2 and CTN2 holding the signals from the pixels of the N+1th row are performed in a temporally overlapped manner. Thereafter, the above operation is performed with respect to pixels of the N+2th and subsequent rows.

Figure 4:
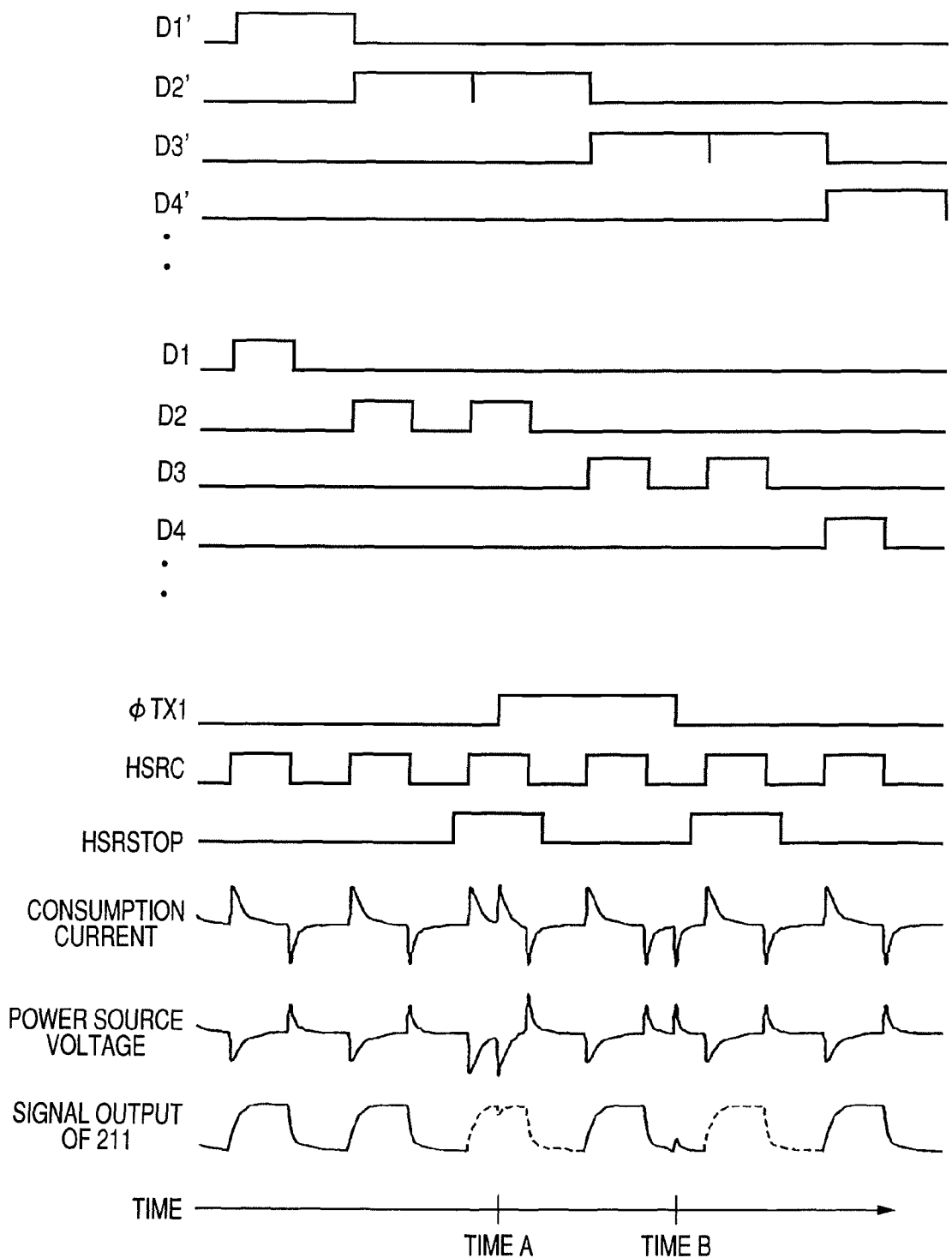
FIG. 4 is a schematic view for describing the embodiment of the present invention.

FIG. 4 is a view illustrating a method of driving the solid-state imaging apparatus according to the present embodiment. According to the present embodiment, signal HSR-STOP is changed to a high level around time A and time B when drive signal φTX1 causes peculiar consumption current to be generated, so that the horizontal scanning by the horizontal scanning circuit is stopped, and peculiar consumption current/power source voltage fluctuation is avoided to prevent noise from being added to the signal output. The specific operation will be described below. The clock buffer 202 performs waveform shaping of horizontal scanning signal HSRC being a clock pulse and outputs the signal. An AND of the output signal from the clock buffer 202 and a logically inverted signal of signal HSRSTOP is calculated, and the calculated AND is input to a clock input terminal C of the flip-flop 201. The flip-flop 201 outputs Data D1', D2', D3', D4', . . . in this order in synchronization with the rising edge of the input signal to the clock input terminal C. More specifically, during a period when signal HSRSTOP is at low level, the flip-flop 201 shifts the high level output sequentially to D1' to D6' responsive to the rising edge of horizontal scanning signal HSRC. An AND of the output signal from the clock buffer 202 and data D1', D2', D3', D4', . . . is calculated, and data D1, D2, D3, D4, . . . are output. The switch 207 closes responsive to the high level of data D1 to D6, so that the signal of the capacitor 206 is read out to the horizontal common lines 208 and 209. The amplifier 211 being a differential processing circuit subtracts the noise signal of the horizontal common line 208 from the pixel signal of the horizontal common line 209, and outputs the pixel signal obtained by eliminating noise.

According to the present embodiment, as illustrated in FIG. 4, drive signal φTX1 transit at time A and time B; and signal HSRSTOP is changed to a high level around time A and time B. Since signal HSRSTOP is used, the data output D2'→D3', for example, of the horizontal scanning circuit can be stopped without stopping horizontal scanning signal HSRC. As a result, noise caused by stopping of horizontal scanning signal HSRC is prevented from being added. Thus, horizontal scanning signal HSRC can be input while its periodicity is kept, so that periodical consumption current continues to occur in the clock buffer 202. However, horizontal scanning signal HSRC is masked by signal HSRSTOP so that horizontal scanning signal HSRC is not input to the flip-flop 201; consequently, data transfer D2'→D3' does not occur at time A, and thus the signal from the capacitor 206 corresponding to data D2 is read out twice. The signal can be read any number of times from the same capacitor 206. The second reading out signal from the same capacitor 206, i.e., the output of the amplifier 211 at time A contains peculiar noise added by the rising edge of drive signal φTX1, but this signal is a dummy signal which is not used for image formation, and does not affect the image. After being output from the solid-state imaging apparatus, the dummy signal is eliminated by the digital signal processing circuit 220 called a DFE (Digital Front End). The easiest method of eliminating the dummy signal is to eliminate a signal of a preliminarily identified address. For the noise caused by the falling edge of drive signal φTX1 at time B, also, when a high level pulse of signal HSRSTOP is similarly input, peculiar noise can be prevented from being generated. In this way, signal HSRSTOP is changed to a high level only at the time of rising and falling of drive signal φTX1 or during the pulse period of horizontal scanning signal HSRC immediately after that time, so that a signal to be used for image formation is not read out and a dummy signal is read out instead. And during a period between time A and time B in which there is no transition of drive signal φTX1, a signal to be used for image formation is read out and further, the continuity of power source voltage fluctuation caused by consumption current of the horizontal scanning signal HSRC clock buffer 202 can be kept. According to this technique, the BLK operation and the horizontal scanning overlap temporally so that high-speed reading is achieved; further, while horizontal scanning signal HSRC causing power source voltage fluctuation is input, the horizontal scanning is stopped only during a transition period of signal φTX1 unrelated to the horizontal scanning, so that peculiar noise can be prevented from being generated.

Figure 5:
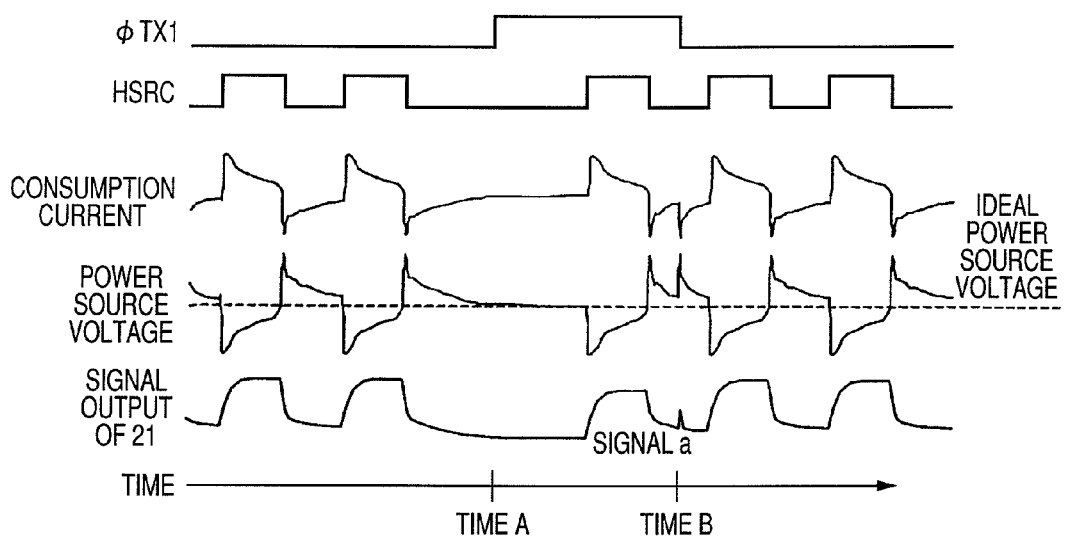
FIG. 5 is a schematic view for describing the embodiment of the present invention.
Figure 6:
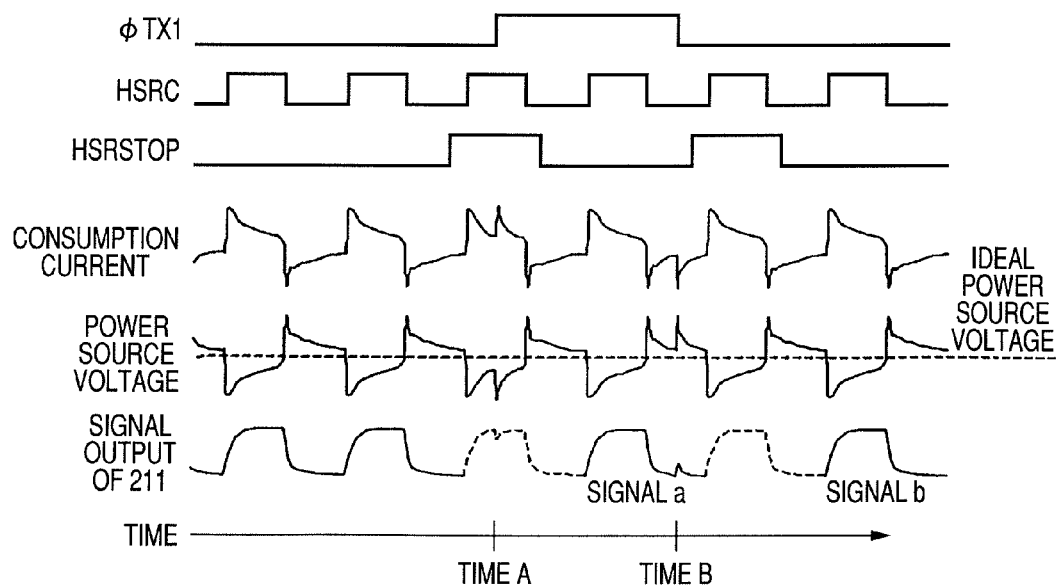
FIG. 6 is a schematic view for describing the embodiment of the present invention.
Figure 7:
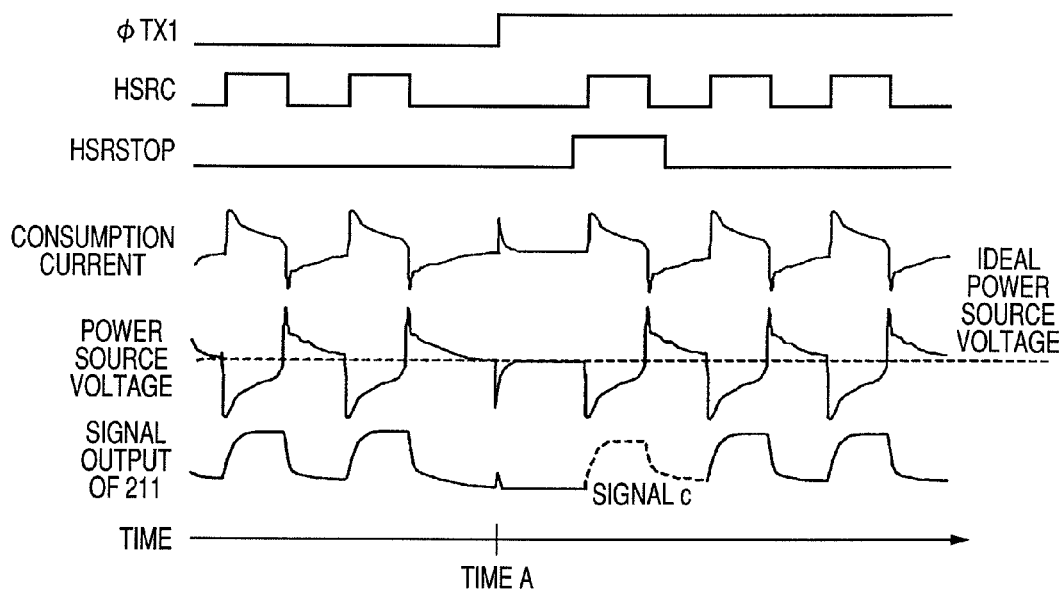
FIG. 7 is a schematic view for describing the embodiment of the present invention.

When the reading is sped up, as illustrated in FIG. 5, the period having no power source voltage fluctuation is lost, and thus the operation is performed at a somewhat offset voltage relative to an ideal power source voltage. In this case, when horizontal scanning signal HSRC is stopped, the power source voltage becomes stable, thus causing the power source voltage at the time of reading signal a after restarting inputting of horizontal scanning signal HSRC to be different from that at the other timing, so that the signal level shifts relative to the other timing. That is, this is observed as noise. An example of higher-speed reading according to the present embodiment is illustrated in FIG. 6. Horizontal scanning signal HSRC is continuously input by using signal HSRSTOP, so that power source voltage fluctuation causing noise is made continuous. Accordingly, signals a and b are both affected, similarly to other signal outputs, by power source voltage fluctuation, so the appearance of the fluctuation as noise can be reduced. As illustrated in FIG. 7, a method can also be used by which, even when horizontal scanning signal HSRC is stopped, a high level pulse of signal HSRSTOP at a timing of first bit after restarting of horizontal scanning signal HSRC input is input, and handle signal c as a dummy signal, and prevent subsequent signals from being affected. In the initially described example of FIG. 1 in which horizontal scanning signal HSRC is stopped, when signal reading is performed at a low speed, the advantageous effect can be expected; but a low effect is achieved at a high signal reading speed. However, the examples of FIGS. 2, 4, 6 and 7 according to the present embodiment have the advantageous effect not only at a low reading speed but also at a high reading speed. As described above, according to the present embodiment, high-speed reading and high-quality image signal are provided. It is noted that the above effect has been described with respect to power source voltage fluctuation, but the similar effect is also achieved with respect to ground voltage fluctuation.

Second Embodiment

Figure 8:
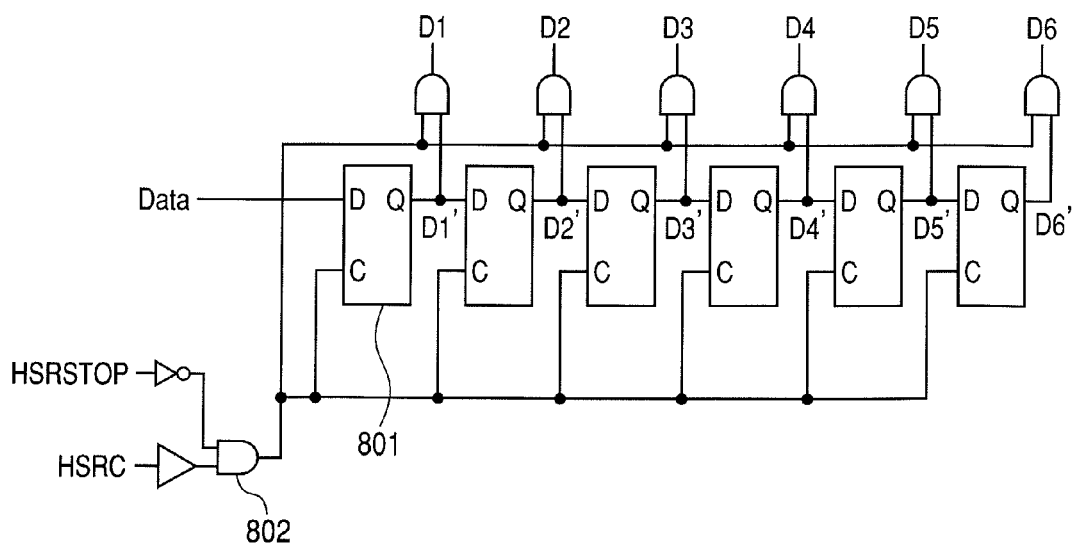
FIG. 8 is an equivalent circuit diagram for describing an embodiment of the present invention.
Figure 9:
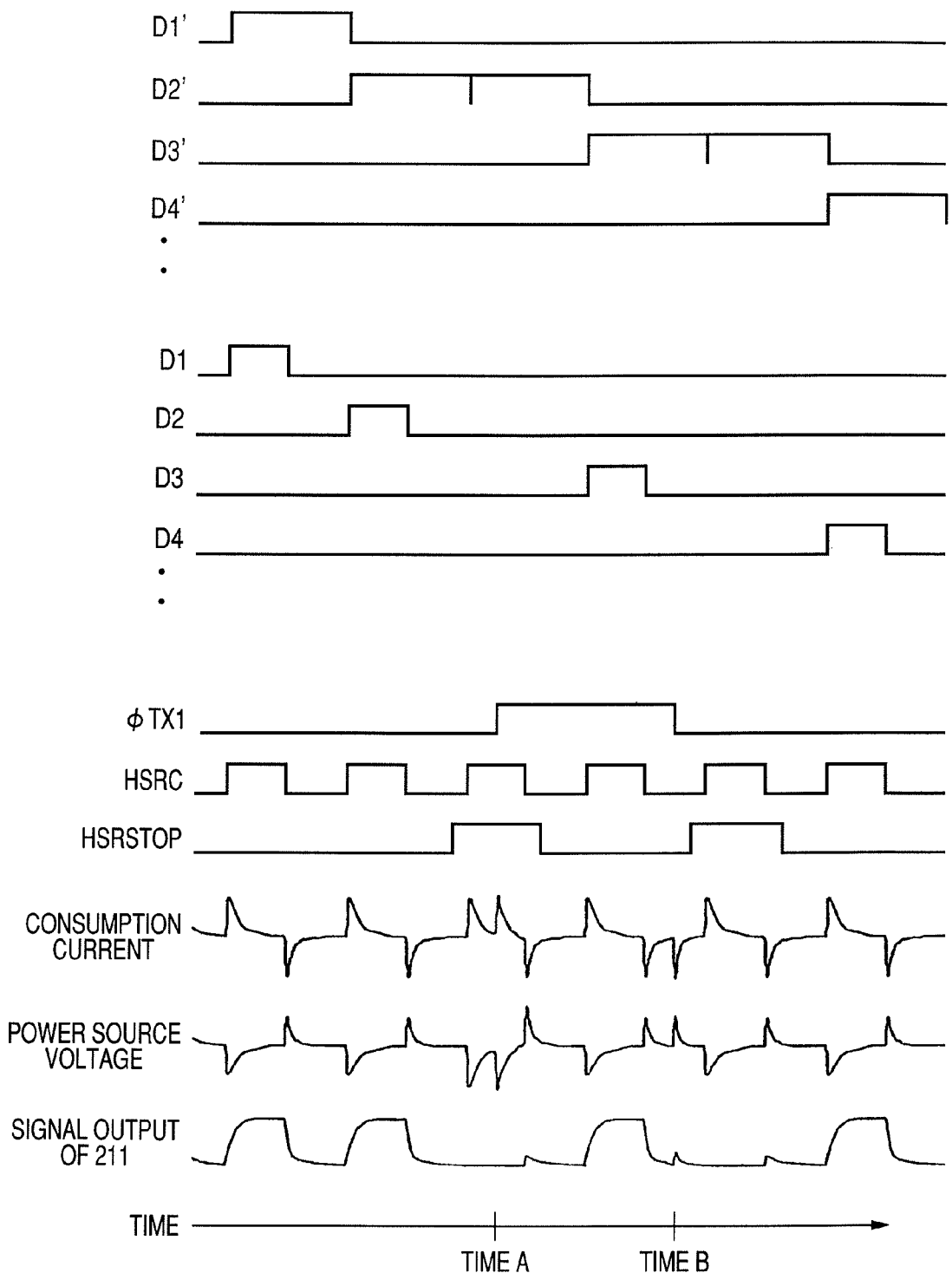
FIG. 9 is a schematic view for describing the embodiment of the present invention.

A solid-state imaging apparatus according to a second embodiment of the present invention will be described with reference to FIGS. 8 and 9. FIG. 8 illustrates an equivalent circuit corresponding to the horizontal scanning circuit of FIG. 2; in other aspects, including the reading from the pixel to the capacitor, the configuration is the same as that of the first embodiment. FIG. 9 is a drive timing chart.

A clock buffer 802 performs waveform shaping of horizontal scanning signal HSRC and outputs the signal. An AND of the output signal from the clock buffer 802 and an logically inverted signal of signal HSRSTOP is calculated, and the calculated AND is input to the clock input terminal C of the flip-flop 801. The flip-flop 801 outputs data D1', D2', D3', D4', in this order in synchronization with the rising edge of the input signal to the clock input terminal C. More specifically, during a period when signal HSRSTOP is at low level, the flip-flop 801 shifts the high level output sequentially to D1' to D6' responsive to the rising edge of horizontal scanning signal HSRC. An AND of the output signal from the clock buffer 802 and a logically inverted signal of signal HSRSTOP is calculated, and then an AND of the calculated AND and Data D1', D2', D3', D4', is calculated, and data D1, D2, D3, D4, . . . are output.

As illustrated in FIG. 9, during a pulse of horizontal scanning signal HSRC at time A and during a pulse of horizontal scanning signal HSRC immediately after time B when data is not transferred between the flip-flops 801, signal HSRSTOP is changed to a high level. Thus, no signal for reading out signals from the capacitor 206 is output from any of data D1 to D6. According to the present embodiment, temporal overlapping of the BLK operation and horizontal scanning allows a high-speed reading operation. Further, the supply of horizontal scanning signal HSRC pulse is stopped by signal HSRSTOP only during a transition period of signal ɸTX1 unrelated to horizontal scanning signal HSRC, so that peculiar noise can be prevented from being generated. The present embodiment does not require AND circuits for each flip-flop used for masking by signal HSRSTOP in the first embodiment, so that the chip area can be reduced. The present embodiment is particularly advantageous in the case of high-speed reading. As described above, according to the present embodiment, high-speed reading and high-quality image signal are provided. It is noted that the above effect has been described with respect to power source voltage fluctuation, but the similar effect is also achieved with respect to ground voltage fluctuation.

Third Embodiment

Figure 10:
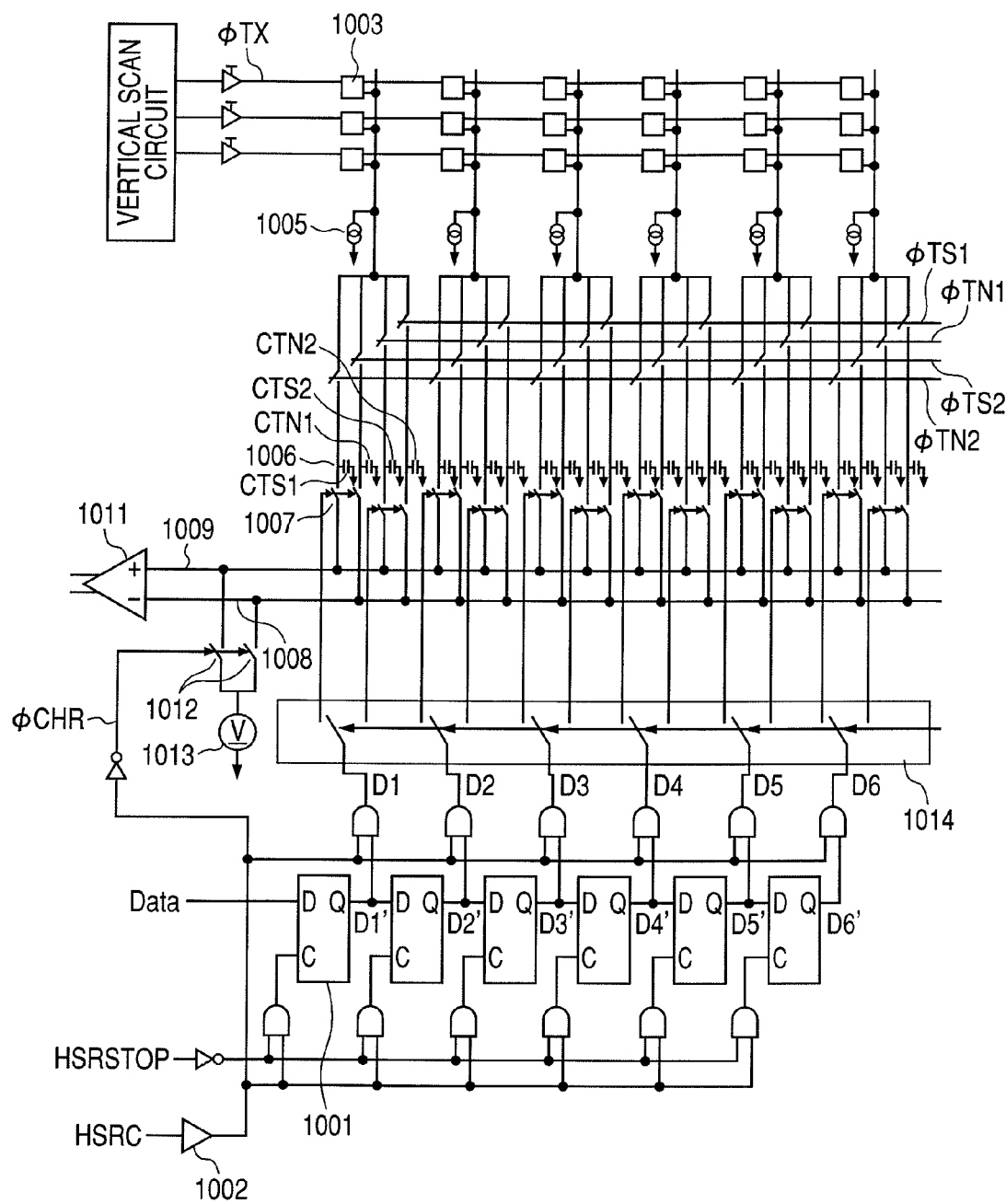
FIG. 10 is an equivalent circuit diagram for describing an embodiment of the present invention.
Figure 11:
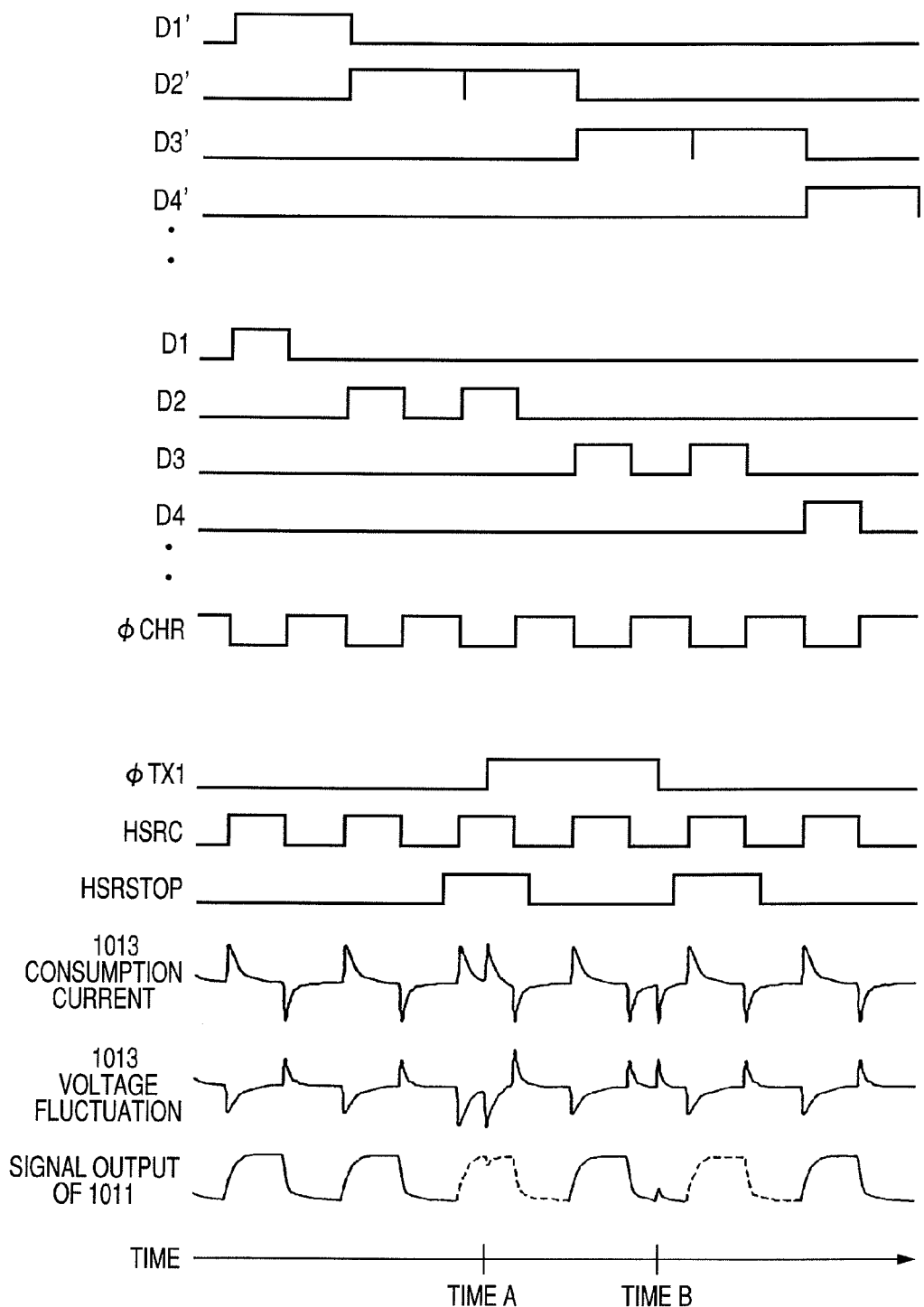
FIG. 11 is a schematic view for describing the embodiment of the present invention.

A solid-state imaging apparatus according to a third embodiment of the present invention will be described with reference to FIG. 10. FIG. 11 is a waveform diagram for describing the operation of the solid-state imaging apparatus of FIG. 10. Reference numeral 1001 denotes a flip-flop constituting the horizontal scanning circuit. The horizontal scanning circuit further includes a clock buffer 1002, terminal HSRSTOP being a mask signal input portion, and AND gate. The clock buffer 1002 performs waveform shaping of horizontal scanning signal HSRC. Reference numeral 1003 denotes a pixel; 1005 a constant current load; 1006 a capacitor for temporarily saving a pixel signal; 1007 a switch for connecting the capacitor 1006 to horizontal common lines 1008 and 1009 and thereby reading out the signal. An amplifier 1011 being a differential processing circuit outputs a differential signal between the signal output to the horizontal common line 1008 and the signal output to the horizontal common line 1009. Reference numeral 1012 denotes a switch for resetting the horizontal common lines 1008 and 1009 to a power source voltage 1013 which is a reset power source voltage for the horizontal common lines 1008 and 1009. Reference numeral 1014 denotes a circuit which selects one of a pair of capacitors CTS1 and CTN1 and a pair of capacitors CTS2 and CTN2, the selected one being read out to the horizontal common lines 1008 and 1009. The method of reading from the pixel 1003 to the capacitor 1006 is similar to that of the first embodiment. The noise preventing method similar to that of the first embodiment is also used by which the supply of horizontal scanning signal HSRC pulse is temporarily stopped by signal HSRSTOP around time A and time B when peculiar consumption current occurs.

According to the first and second embodiments (FIG. 2), the switch 212 is controlled by signal ɸCHR. According to the present embodiment (FIG. 10), however, a logically inverted signal of the output signal from the clock buffer 1002 is used as signal ɸCHR, and the switch 1012 is controlled by signal ɸCHR.

The present embodiment is characterized by an operation by which, whenever a signal is read out from the capacitor 1006 to the horizontal common lines 1008 and 1009, the horizontal common lines 1008 and 1009 are reset to the voltage of the power source 1013 by the switch 1012. As illustrated in operation in FIG. 11, similarly to the first and second embodiments, the supply of horizontal scanning signal HSRC pulse is temporarily stopped by signal HSRSTOP, whereby while the voltage periodicity of the reset power source 1013 and the horizontal common lines 1008 and 1009 is kept, the resetting can continue. Accordingly, the periodicity of consumption current of the reset power source 1013 can also be kept.

According to this technique, the BLK operation period and the horizontal scanning overlap temporally so that high-speed reading is achieved; further, the supply of horizontal scanning signal HSRC pulse is stopped only during a transition period of signal ɸTX1 unrelated to horizontal scanning signal HSRC, so that peculiar noise can be prevented from being generated. As a result, high-speed reading and high-quality image signal are provided.

In the first to third embodiments, the advantageous effect of the present invention has been described by taking as an example, noise caused by peculiar consumption current which occurs at a transition of drive signal ɸTX1. However, when a signal unrelated to the periodicity of horizontal scanning operation is considered instead, also, the similar effect can be achieved. Further, the cause of noise is not limited to peculiar consumption current of the clock buffer caused by horizontal scanning signal HSRC. Referring to FIG. 10, when the capacitor 1006 is charged by the constant current load 1005 via ɸTS1, ɸTN1, ɸTS2 and ɸTN2, also, transient consumption current occurs, causing noise in the signal during the horizontal scanning. In this case, also, the technique according to the first to third embodiments is advantageous. Further, the time of inputting signal HSRSTOP, the number of times of reading repeatedly from the same capacitor, and the temporal width thereof may be adjusted depending on the conditions. The third embodiment is particularly advantageous for high-speed reading, and high-speed reading and high-quality image signal are provided. It is noted that the above effect has been described with respect to power source voltage fluctuation, but the similar effect is also achieved with respect to ground voltage fluctuation.

According to the first to third embodiments, noise added to a reading signal by power source voltage fluctuation caused by a signal unrelated to the periodicity of horizontal scanning operation, can be prevented from being generated, thus providing high-quality image.

Figure 12:
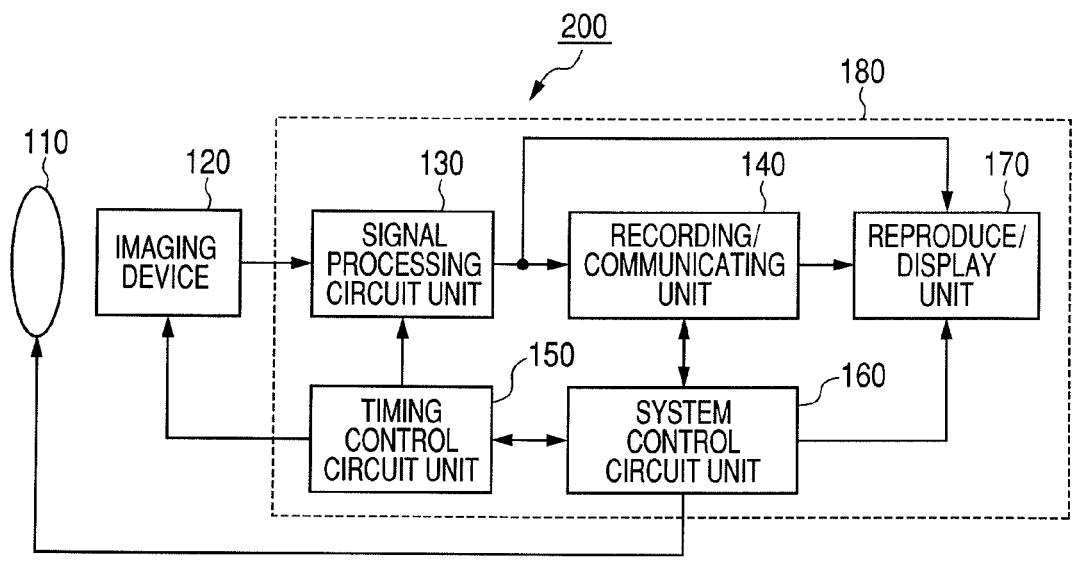
FIG. 12 is a configuration diagram of an imaging system.
Figure 13:
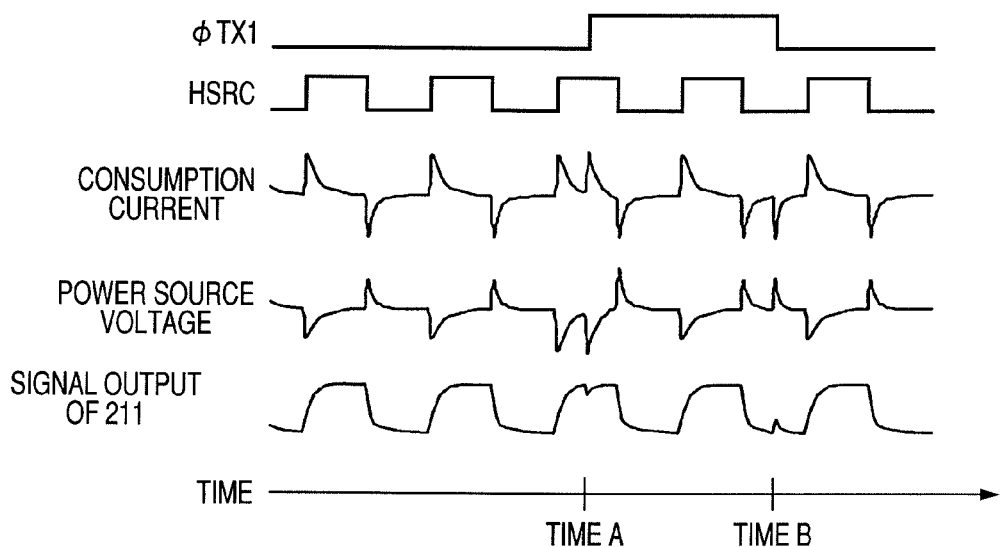
FIG. 13 is a schematic view for describing the related art.

A schematic configuration of an imaging system 200 in which the solid-state imaging apparatus of the present invention is used, will be described with reference to FIG. 12. FIG. 12 is a configuration diagram of the imaging system 200 according to the present embodiment.

The imaging system 200 includes an optical system 110, solid-state imaging apparatus 120 and signal processing unit 180. The signal processing unit 180 includes a signal processing circuit unit 130, recording/communicating unit 140, timing control circuit unit 150, system control circuit unit 160 and reproduce/display unit 170.

The optical system 110 forms a subject image on a pixel array being an imaging surface of the solid-state imaging apparatus 120. The solid-state imaging apparatus 120 is a solid-state imaging apparatus according to the first embodiment, for example. The solid-state imaging apparatus 120 converts the subject image formed on the pixel array into an electrical signal. The solid-state imaging apparatus 120 reads out the electrical signal from the pixel array and outputs the signal to the signal processing circuit unit 130.

The signal processing circuit unit 130 processes, according to a preliminarily set method, the electrical signal supplied from the solid-state imaging apparatus 120 for image data compression. When the solid-state imaging apparatus does not include an A/D converter, the signal processing circuit unit 130 may perform the A/D conversion. Further, the signal processing circuit unit 130 may be arranged in the inner side of the solid-state imaging apparatus. The signal processing circuit unit 130 supplies the processed image data to the recording/communicating unit 140 and reproduce/display unit 170.

The recording/communicating unit 140 records the image data supplied from the signal processing circuit unit 130 on a recording medium (not illustrated), or sends the image data to an external apparatus (not illustrated). Also, the recording/communicating unit 140 reads image data from the recording medium and supplies the data to the reproduce/display unit 170, or receives a predetermined instruction from an input unit (not illustrated) and supplies the instruction to a system control circuit unit 160.

The reproduce/display unit 170 displays image data supplied from the signal processing circuit unit 130 or recording/communicating unit 140 on a display device.

The timing control circuit unit 150, used to supply a signal for controlling the timing of driving the solid-state imaging apparatus 120, supplies signal HSRC being a clock pulse and signal HSRSTOP being a mask signal to the horizontal scanning circuit of the solid-state imaging apparatus 120.

The system control circuit unit 160 receives predetermined instruction information from the recording/communicating unit 140. The system control circuit unit 160 controls, responsive to the predetermined instruction, the optical system 110, recording/communicating unit 140, reproduce/display unit 170 and timing control circuit unit 150. For example, when an all-pixel reading mode or intermittent reading mode is used, the system control circuit unit 160 controls, according to each mode, the optical system 110, recording/communicating unit 140, reproduce/display unit 170 and timing control circuit unit 150.

The solid-state imaging apparatus according to the first to third embodiments has the following configuration. Multiple pixels 203 and 1003 each include a photoelectric conversion element 301; and a signal based on electric charge obtained by the conversion by the photoelectric conversion element 301 is output responsive to reading out signal φTX1. The multiple pixels 203 and 1003 are arranged along one or more rows. Multiple capacitors 206 and 1006 are arranged correspondingly to columns of the multiple pixels 203 and 1003, and hold signals output from the multiple pixels 203 and 1003. The horizontal scanning circuit includes flip-flops 201, 1001 and AND circuit, and sequentially transfer data pulse Data responsive to clock pulse (horizontal scanning signal) HSRC and thereby sequentially reading the signals held by the multiple capacitors 206 and 1006.

The horizontal scanning circuit includes the terminal HSRSTOP being a mask signal input portion which receives a mask signal. When signals are output from the plurality of pixels to the plurality of capacitors during a horizontal scanning time period in which the horizontal scanning circuit reads the signal of one row of the pixels, the mask signal is input to the terminal HSRSTOP being the mask signal input portion at the time of changing of the reading out signal φTX1. In this case, the data pulse Data is not transferred responsive to the input of the clock pulse HSRC. The clock pulse HSRC is a signal of keeping a periodicity.

The period (BLK operating period) in which signals are output from the plurality of pixels 203 and 1003 to the plurality of capacitors 206 and 1006, and the horizontal scanning time period in which the horizontal scanning circuit reads the signal of one row of the pixels, are temporally overlapped.

The plurality of capacitors 206 and 1006 include a plurality of the first capacitors CTS1 and CTN1 and a plurality of the second capacitors CTS2 and CTN2. In a horizontal scanning time period in which the horizontal scanning circuit reads the signal of one row of the pixels from the plurality of the first capacitors CTS1 and CTN1, the signal output from the pixels of a row different from one row from which the signal is read out from the plurality of the first capacitors, is read out to the plurality of the second capacitors CTS2 and CTN2. Here, the mask signal is input to the terminal HSRSTOP being the mask signal input portion at the time of changing of the reading out signal φTX1, so the data pulse Date is not transferred responsive to the clock pulse HSRC.

When the clock pulse HSRC is input at the time of changing of the reading out signal φTX1, the horizontal scanning circuit stops the transfer of the data pulse Data, and reads signals from the same capacitors 206 and 1006 from which the signal is read out previously.

The imaging system includes the solid-state imaging apparatus and the signal processing circuit 220 (FIG. 2) which removes a signal read out from the same capacitors 206 and 1006 from which the signal is read out previously.

When the clock pulse HSRC is input at the time of changing of the reading out signal φTX1, the horizontal scanning circuit stops the transfer of the data pulse Data, and stops reading signals from the capacitors 206 and 1006.

The above described embodiments are each a specific example for implementing the invention, and the technical scope of the invention should not be restrictively interpreted by the description of the embodiments. Many modifications to the embodiments described above are possible without departing from the spirit and gist of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-048453, filed Feb. 28, 2008, which is hereby incorporated by reference herein in its entirety.

What is claimed is:

1. A solid-state imaging apparatus comprising:
a plurality of pixels arranged in a matrix in one or more rows and one or more columns, wherein each pixel includes a photoelectric conversion element converting light into an electric charge and outputs a read out signal based on the electric charge converted by the photoelectric conversion element;
a plurality of capacitors arranged correspondingly to each of the columns of the plurality of pixels to hold the signal output from the plurality of pixels; and
a horizontal scanning circuit for sequentially reading out the signals held by the plurality of capacitors, by sequentially transferring data pulse in response to a clock pulse, wherein
the horizontal scanning circuit comprises a mask signal input portion to which a mask signal is input, and
when the plurality of pixels output the signals to the plurality of capacitors during a horizontal scan time period in which the horizontal scanning circuit reads out the signal of one row of the pixels, and the read out signals change, the mask signal is input to the mask signal input portion, and a transfer of the data pulse is disabled irrespective of the input of the clock pulse.

2. The solid-state imaging apparatus according to claim 1, wherein
the plurality of capacitors include a plurality of first capacitors, and a plurality of second capacitors, and
during the horizontal scan time period in which the horizontal scanning circuit reads out the signal of a first row of the pixels from the first capacitors, and when the signal is read out to the plurality of second capacitors from the pixels of a second row different from the first row, the mask signal is input to the mask signal input portion, and a transfer of the data pulse is disabled irrespective of the input of the clock pulse.

3. The solid-state imaging apparatus according to claim 1, wherein
the clock pulse is a signal keeping a periodicity.

4. The solid-state imaging apparatus according to claim 1, wherein,
in response to the input of the mask signal at the change of the read out signal, the horizontal scanning circuit stops the transferring of the data pulse, and reads out the signal from the same capacitor as one from which the signal is read out previously.

5. The solid-state imaging apparatus according to claim 1, wherein,
in response to the input of the mask signal at the change of the read out signal, the horizontal scanning circuit stops the transferring of the data pulse, and stops the reading out of the signals from the plurality of capacitors.

6. An imaging system comprising:
a solid-state imaging apparatus according to claim 1; and
a signal processing circuit for removing the signal read out from the same capacitor as one from which the signal is read out previously.

7. The solid-state imaging apparatus according to claim 1, wherein,
the pixel includes an amplifier transistor and a transfer transistor, and
the mask signal is supplied to the mask signal input portion during a period including a period of transition of the transfer transistor from an off state to an on state.

8. The solid-state imaging apparatus according to claim 1, wherein,
the pixel includes an amplifier transistor and a transfer transistor, and
the mask signal is supplied to the mask signal input portion during a period including a period of transition of the transfer transistor from an on state to an off state.

9. A method of driving a solid-state imaging apparatus comprising:
a plurality of pixels arranged along one or more rows, wherein each pixel includes a photoelectric conversion element converting light into an electric charge and outputs a read out signal based on the electric charge converted by the photoelectric conversion element;
a plurality of capacitors arranged correspondingly to the columns of the plurality of pixels to hold the signal outputted from the plurality of pixels; and
a horizontal scanning circuit for sequentially reading out the signals held by the plurality of capacitors, by sequentially transferring data pulse in response to a clock pulse, wherein
the horizontal scanning circuit comprises a mask signal input portion to which a mask signal is input, wherein
the method comprising a step of:
inputting the mask signal to the mask signal input portion and disabling the horizontal scanning circuit from transferring the data pulse irrespective of the input of the clock pulse, when outputting the signals from the plurality of pixels to the plurality of capacitors during a horizontal scan time period in which the horizontal scanning circuit reads out the signals of one row of the pixels and the read out signals change.

* * * * *